United States Patent
Keen et al.

(10) Patent No.: US 8,161,550 B2
(45) Date of Patent: Apr. 17, 2012

(54) NETWORK INTRUSION DETECTION

(75) Inventors: Arthur Keen, Austin, TX (US); Richard J. Mayer, College Station, TX (US)

(73) Assignee: Knowledge Based Systems, Inc., College Station, TX (US)

( * ) Notice: Subject to any disclaimer, the term of this patent is extended or adjusted under 35 U.S.C. 154(b) by 1095 days.

(21) Appl. No.: 12/017,759

(22) Filed: Jan. 22, 2008

(65) Prior Publication Data

US 2008/0178293 A1 Jul. 24, 2008

Related U.S. Application Data

(60) Provisional application No. 60/886,171, filed on Jan. 23, 2007.

(51) Int. Cl.
*G08B 23/00* (2006.01)
*G06F 12/14* (2006.01)
*G06F 15/16* (2006.01)

(52) U.S. Cl. .................. 726/22; 726/23; 726/24; 726/25
(58) Field of Classification Search .................. None
See application file for complete search history.

(56) References Cited

U.S. PATENT DOCUMENTS

| | | | |
|---|---|---|---|
| 6,675,164 B2 | 1/2004 | Kamath et al. | |
| 6,708,163 B1 | 3/2004 | Kargupta et al. | |
| 6,775,657 B1 | 8/2004 | Baker | |
| 7,007,035 B2 | 2/2006 | Kamath et al. | |
| 7,089,592 B2 | 8/2006 | Adjaoute | |
| 7,162,741 B2 * | 1/2007 | Eskin et al. | 726/25 |
| 7,530,105 B2 * | 5/2009 | Gilbert et al. | 726/22 |
| 7,624,448 B2 * | 11/2009 | Coffman | 726/23 |
| 2006/0112146 A1 * | 5/2006 | Song et al. | 707/200 |
| 2008/0086551 A1 * | 4/2008 | Moy | 709/223 |

OTHER PUBLICATIONS

Cook et al., "Graph-Based Data Mining", 2000, IEEE Intelligent Systems, pp. 32-41.*
Holder et al., "Graph-Based Data Mining", 2005, Idea Group Inc., pp. 1-6.*
Singh et al., "Investigating and Evaluating Behavioural Profiling and Intrusion Detection Using Data Mining", 2001, Springer-Verlag Berlin, pp. 153-158.*

* cited by examiner

*Primary Examiner* — William Powers
(74) *Attorney, Agent, or Firm* — Schwegman, Lundberg & Woessner, P.A.

(57) ABSTRACT

Apparatus and systems, as well as methods and articles, may operate to monitor communications between network nodes coupled to each other via at least one network, and map the communications to one or more communications graphs which are physically distributed over a plurality of network hosts. Network intrusion is detected using distributed graph-based data mining with respect to a selected subgraph and the communications graphs. Other embodiments are described and claimed.

20 Claims, 4 Drawing Sheets

NETWORK INTRUSION DETECTION

PRIORITY CLAIM

This application claims the benefit of priority under 35 U.S.C. §119(e) to U.S. Provisional Patent Application Ser. No. 60/886,171, titled "Netcentric Operations Defense Environment", filed on Jan. 23, 2007, and incorporated herein by reference in its entirety.

BACKGROUND INFORMATION

The size of and number of networks connecting electronic devices can be quite large with respect to the number of devices connected to the networks as well as in the geographic area covered by the networks. The amount of data that electronic networks can handle may also be very large. Thus, while it is possible to have a human analyze the data in a network in order to detect network intrusion, the sheer volume of work required makes this approach infeasible.

Since discovering network intrusion while attacks are taking place is useful, manufacturers have long sought ways of effectively automating the task of detecting intruders in an electronic network. While some attempts in the computer industry have been made to harness the power of data mining for detecting network intrusion, implementations to-date are relatively inefficient (e.g., involving human labor for updates), or provide less than the desired degree of effectiveness and resistance to attacks (e.g., by using centralized administration, detection, and/or data storage).

DETAILED DESCRIPTION

To address some of the challenges described above, many embodiments of the invention can operate automatically provide electronic network intrusion detection while attacks occur, without using attack signatures. Both external and internal attacks can be detected. This type of operation denies the adversary an opportunity to attack the security system itself.

Machine learning is used in conjunction with graph-based data mining (GDM) in a distributed manner, applied homogeneously across network nodes, so that a central component is not vulnerable to disablement, and variants of previously identified infrequent behavior can be detected throughout the system. Network events are also stored in a distributed fashion. Employing distributed storage and execution of the various system subcomponents in this fashion enables scaling to larger networks, obviating the use of hub-and-spoke security architectures that often flood associated networks with events. No manual training is used—machine learning (ML) algorithms and data provided by the various embodiments, include data from network analyzers, such as open source command-line tools (e.g., TcpDump of the Network Research Group (NRG) of the Information and Computing Sciences Division (ICSD) at Lawrence Berkeley National Laboratory (LBNL) in Berkeley, California), and more advanced tools that have graphical user interface front-ends (e.g., Ethereal® and Wireshark® protocol analyzers, available under GNU General Public License), can be used instead.

For the purposes of this document, a "network object" is any device that communicates over a network. Network objects may communicate with themselves and other objects. For example, network objects may include software processes, network nodes, hosts, etc.

"Nodes" may be divided into two types: network nodes and graph nodes. Network nodes (hereinafter simply "nodes") refer to a device attached to a network, such as a terminal on a network, or any other point on a network where messages can be created, received, or transmitted. Thus, a node can be any device that communicates and/or relays communication and is connected to a computer network, such as computers, personal digital assistants (PDAs), cell phones, routers, switches, and various other networked devices. On a Transmission Control Protocol/Internet Protocol (TCP/IP) network, a node is any device with an IP address. If the node is programmable, it is called a "host" because it has the ability to host software, including distributed intrusion detection software. A "graph node" is a modeling object that is used to represent network nodes, as well as users, software, etc. in a graph model. These graphical representations of the physical network, users, and software etc. are the basis for the graph data mining techniques applied in the various embodiments of this invention.

Figure 1:
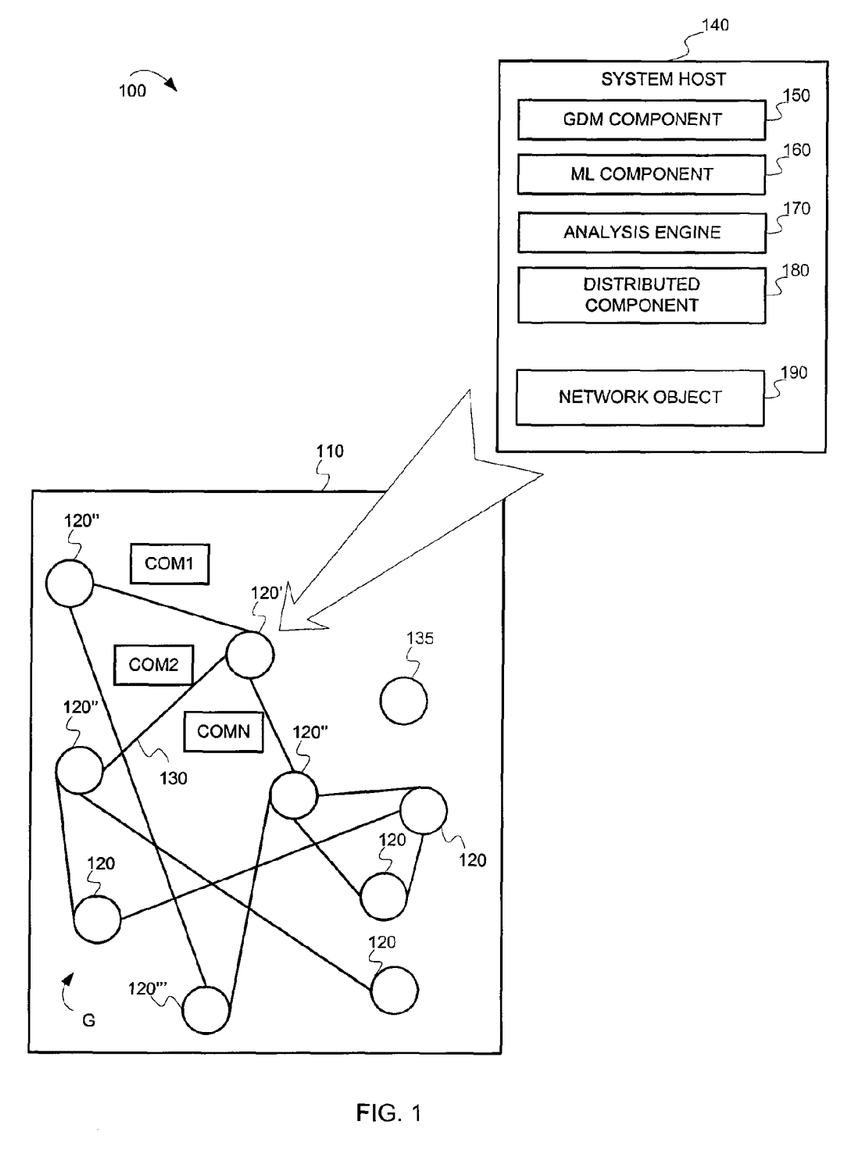
FIG. 1 is a block diagram of a system according to various embodiments of the invention.

FIG. 1 is a block diagram of a system 100 according to various embodiments of the invention. One or more networks 110 couples the hosts 120 together using links 130 over which communications occur. The links 130 may be wired or wireless. Network communications COM1, COM2, ..., COMN among hosts 120 over the links 130 can be mapped to a communications graph G.

It should be noted that while hosts 120 are shown explicitly in FIG. 1 to illustrate communications among that class of network objects, this is done as a matter of convenience. That is, any type of network object 190 may be substituted for any or all of the hosts 120 for the purposes of this document.

Each host 120 in the system comprises a number of components. An identical set of components 140 may thus be distributed to each of the hosts 120, and thus, instead of a central intrusion detection component, each host 120 in the network(s) 110 may run system software (e.g., the set 140 of components 140) that operates to collaborate with other hosts 120 to detect intrusions. Since there is no central administration or intrusion detection component, the system 100 can be more resilient and robust, to better withstand attacks and network failures that involve individual hosts 120. Thus, the system 100 does not depend on a central node to make decisions; instead, all available hosts 120 participate in the process of detecting network intrusion. Each host 120 may comprise a network object 190 (e.g., a node), as mentioned above, or include additional network objects 190 (e.g., virtual nodes), as will be explained in more detail below.

The set of components 140 may comprise a GDM component 150 to run GDM algorithms that use graph-based data structures in conjunction with data mining algorithms to identify intrusion patterns. This graph-based method will be described in more detail in the sections below.

The set of components 140 may also comprise an ML component 160, which can train the system 100 to detect both internal as well as external attacks. The ML component 160 can learn of new network attacks by using a combination of artificial intelligence techniques, including inductive as well as deductive reasoning techniques.

The set of components 140 may also comprise an analysis engine 170. This engine 170 can analyze the inputs from the GDM and ML components 150, 160 to determine if an attack is unfolding. For example, the analysis engine 170 can compare GDM component 150 results with training sets developed by the ML component 160 to determine if an attack is taking place. New attacks can also be detected, perhaps showing up as derivatives of previous attacks in the ML component 160. In this case, the GDM component 150 is able to extract signatures (e.g., patterns that are eventually discovered to represent known malicious behavior) created by the ML component 160 from raw data fed into the network node (e.g., via network analyzers).

The set of components 140 may also comprise a distributed component 180 that communicates with neighboring hosts to share data and to participate in the decision process. The distributed component 180 in one host 120' does not need to talk to every host 120 in the network 110. Instead, it may be configured to communicate with neighboring hosts 120", which then share information from other neighbors. The system 100 can scale with the size of the network 110 by simply installing the set of components 140 (e.g., as system software) on new hosts 135 in the network 110 as they are added.

It should be noted that "neighboring hosts" in the context of various embodiments can mean hosts 120 connected closely together in a physical sense (e.g., spatial neighbors), or hosts 120 that share common behavior patterns (e.g., behavioral neighbors). Therefore, hosts 120' may seek to align or group themselves as neighbors with other hosts 120" to create clusters that have similar communication behavior patterns (e.g., ports used, destinations taken, and protocols implemented). Since neighboring hosts 120 operate to share information among themselves. Thus, partial-redundancy, which is a compromise between complete redundancy and no redundancy, exists in many embodiments.

Because the number of hosts 120 is a subset of the total number of network nodes, virtualization of intrusion detection nodes is used in some embodiments. In other words, each host 120 has at least one instance of the intrusion detection software, plus instances representing network nodes that are not programmable (i.e., not hosts). Thus, virtual system nodes 120''' can be created for objects that will not allow the set of components 140 to be installed. These virtual nodes 120''' can then execute software to implement the components 140 for such objects that do not join the system 100 as hosts 120. In some embodiments, the virtual system nodes 120''' are executed on physical hosts 120 in the system (e.g., as included network objects 190). The class of objects that do not join the system 100 may include external hosts communicating with the network 110, internal network nodes that do not allow the components 140 to be installed or cannot have the components 140 installed, and users, among others.

Communications between hosts 120 can be grouped into intentional conversations among one or more hosts 120. Each conversation comprises a subgraph within a graph of the network communications COM1, COM2, . . . , COMN. These conversations may represent legitimate activity, such as logging onto the email server and reading and replying to emails. They may also represent malicious activity, such as a coordinated, distributed port scan. Conversation patterns can be identified to determine if they are malicious without using signatures by using the GDM and ML components 150, 160 to extract communication behavior patterns from the network communications COM1, COM2, . . . , COMN using Social Network Analysis (SNA) metrics.

In this manner, graphs can be used to represent communication COM1, COM2, . . . , COMN among hosts 120 in the network 110 and hosts 120 external to the network 110. Graph nodes represent the hosts 120 of the network 110 and hosts outside of the network 110 that communicate with in-network hosts 120. The edges of the graphs, or arcs connecting the hosts 120 represent directed communication from one host 120 to another. This representation can be generalized to explicitly represent communication between users, applications, and other objects.

For example, consider a graph G represented as G(V, E, f), where V is a set of vertices $\{v_1, v_2, ..., v_n\}$, E a set of edges $\{e_1, e_2,..., e_m\}$ connecting some vertex pairs in V, and f is a mapping function: $E \rightarrow V \times V$. Each edge e in the set E has a relation represented as $f(e)=(v,v)$ in which v and v are in the set V.

In the system 100, the graph G is physically distributed over the hosts 120 in the network 110 such that there is a graph node for each object (e.g., host, user, application, etc.) executing on the hosts 120 of the network 110. The system nodes collectively monitor and convert network communications COM1, COM2, . . . , COMN into a graph representation that can be used in conjunction with GDM to detect intrusion. The information associated with the communications COM1, COM2, . . . , COMN can be extracted by each node in the system, perhaps by using network protocol analyzers. Thus, many embodiments can be realized.

For example, a system 100 according to some embodiments comprises at least one network 110 and network hosts 120 coupled to each other via the at least one network 120. Each one of the network hosts 120 in such embodiments includes components 140, perhaps taking the form of modules to monitor communications COM1, COM2, . . . , COMN between some of the network hosts 120', 120", to map the communications COM1, COM2, . . . , COMN to one or more communications graphs physically distributed over the network hosts 120, and to detect intrusion with respect to the at least one network 110 using GDM for a selected subgraph and the one or more communications graphs.

In some embodiments, the system 100 comprises a network host 120 representing each network object executing on the host nodes of the at least one network 110. The network hosts 120 may comprise a GDM component 150, an ML component 160, and an analysis engine 170 to analyze data provided by the GDM component 150 and the ML component 160 to detect infrequent behavior and provide associated information as potential evidence of an intrusion. The ML component 160 may be used to train the system 100 to detect internal attack signatures and external attack signatures (e.g., signatures in this case comprise graph substructures representing infrequent behavior that the human analyst or other classifier has labeled as malicious). The network hosts 120 may also comprise a distributed component 180 to share the associated information provided by the analysis engine 170 with neighboring network hosts (e.g., hosts 120" may be the neighbors of host 120') included in the set of network hosts 120.

Figure 2:
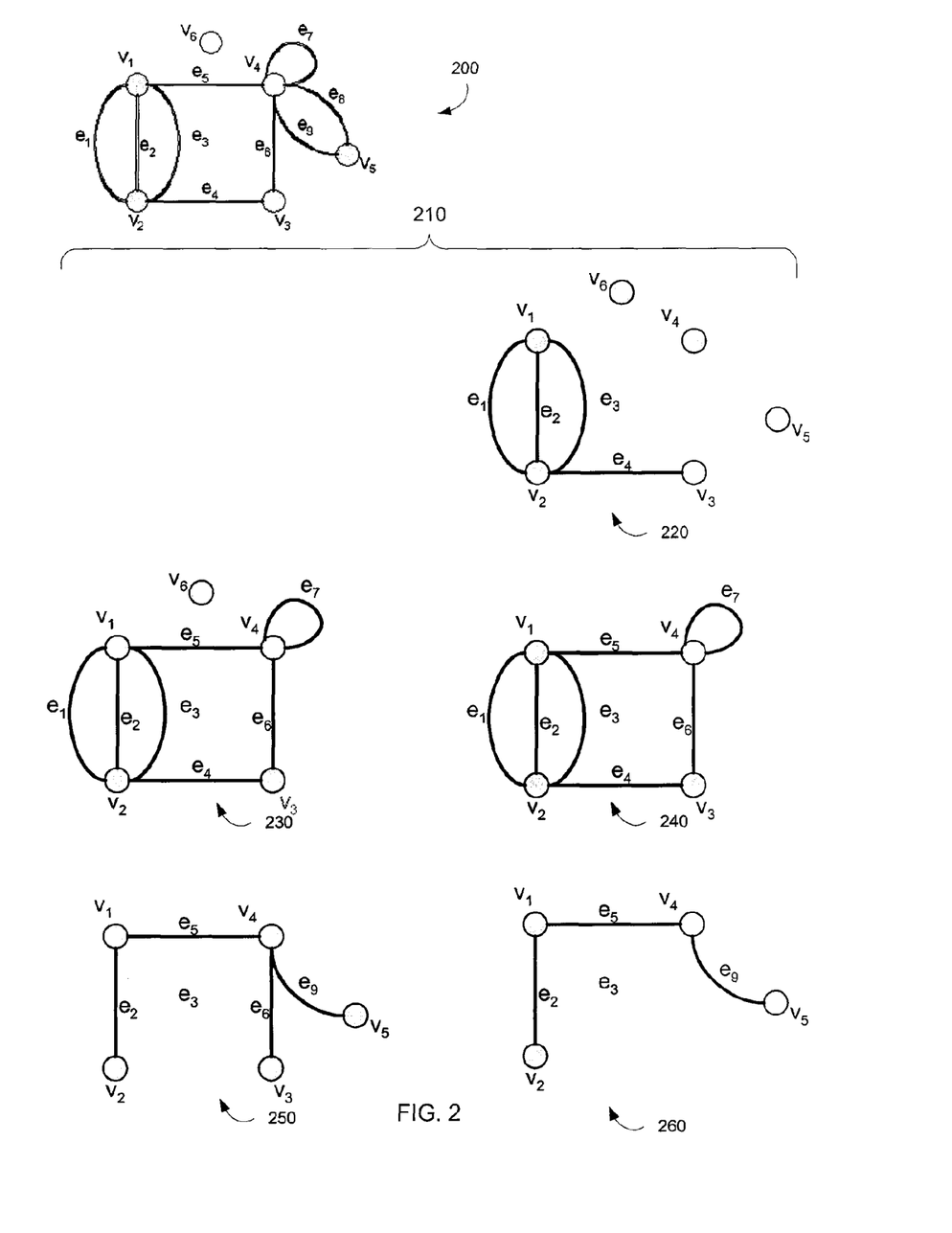
FIG. 2 illustrates a graph and a set of subgraphs according to various embodiments of the invention.

FIG. 2 illustrates a graph 200 and a set of subgraphs 210 according to various embodiments of the invention. As noted previously, subgraphs 210 can represent conversations or scenarios conducted among networked objects. For example, infrequent behavior like surveillance, intrusion, cleanup, and data exfiltration are communication patterns that may be represented by subgraphs forming parts of the network communications graph 200. In particular, these subgraphs may be used to indicate the existence of malicious behavior, including coordinated attacks. Referring to the functional notation used previously, it can be seen that $V = \{v_1, v_2, v_3, v_4, v_5, V_6\}$ and E={$e_1, e_2, e_3, e_4, e_5, e_6, e_7, e_8, e_9$} in the graph 200 (i.e., graph G). Each edge e in the set E has a relation represented as f (e) =(v,v) in which v and v are in the set V.

The most basic class of substructures to be found in graph 200 is a general subgraph, of which subgraph 220 is an example. Here, vertices $v_4, v_5$, and $v_6$, as well as edges $e_5$ -$e_9$ are missed.

Another substructure is the induced subgraph Gi of a graph G, having a subset of the vertices of graph G and the same edges between pairs of vertices as in the graph G. Subgraph 230 is an example of an induced subgraph of graph 200 in which vertices v5 and v6 are missed. In this case, only edges $e_8$ and $e_9$ are missed, while $e_5$ - $e_7$ are retained (since they exist among $v_1, v_3$, and $v_4$ in the original graph 200).

A third class of substructure is a connected subgraph Gc of graph G, where all vertices in the subgraph are mutually reachable through some edges in the subgraph. Subgraph 240 is an example of the connected subgraph of graph 200 where v6 is also missed from the induced subgraph 230. Moreover, subgraph 240 is an example of an "induced and connected subgraph" since it satisfies both conditions of the induced subgraph and the connected subgraph.

Another class of substructure is the acyclic subgraph Ga of graph G, also called a tree. An example of this substructure is the subgraph 250. Yet another class of substructure is the path subgraph Gp of Graph G. An example of this substructure is the subgraph 260. Observed or discovered subgraphs may be shared among neighboring hosts within a network.

Subgraph Isomorphism can be implemented as part of distributed GDM in various embodiments. Subgraph isomorphism is the activity of finding subgraphs (e.g., one or more subgraphs in the set of subgraphs 210) within a larger graph (e.g., graph 200) that match a chosen or particular subgraph. Thus, subgraph isomorphism can be used by the system 100 (see FIG. 1) to discover graph patterns that match a particular graph pattern during the distributed use of GDM. Subgraphs to be matched may be selected based on known or suspected association with malicious behaviour/attacks.

Given two graphs $G_x$ ($V_x, E_x, f_x$) and $G_y$ ($V_y, E_y, f_y$), the subgraph isomorphism problem is to find the subgraphs $G_{sx}$ ($V_{sx}, E_{sx}, f_x$), $G_{sy}$($V_{sy}, E_{sy}, f_y$) and a bijection mapping $g_{sy}$ between the vertices in $V_{sx}$ and the vertices in $V_{sy}$ such that $G_{sx}$ and $G_{sy}$ are identical. For example, the subgraphs 220, 240 commonly share the subgraph that includes vertices {$v_1, v_2, v_3$} and the edges {$e_1, e_2, e_3, e_5$} under the bijection mapping of $v_i = g_{bd}(v_i)$, i=1, 2, 3. Thus, this mapping is a subgraph isomorphism between the subgraph 220 and the subgraph 240.

Improving the efficiency of determining the existence of subgraph isomorphism is often useful with respect to detecting intrusion. For example, a given system can use graph invariants to reduce the search space for graph search algorithms. Graph invariants can also form the basis for feature vectors in statistical and ML approaches to graph search implementations of subgraph isomorphism (e.g., graph pattern matching).

Graph invariants are metrics that characterize the topological structure of a graph. If two graphs are topologically equivalent (isomorphic) then they will have identical graph invariants. Graph invariants include 1) the number of vertices, 2) the number of edges, 3) the edge degree of vertices, 4) the number of cycles (e.g., communication loops), etc. SNA metrics are also graph invariants. However, it should be noted that when two graphs have identical invariants, it does not follow that they are isomorphic. Systems implemented according to the embodiments described herein can compute graph invariants using algorithms that are also distributed across system nodes.

Some invariants, e.g., minimum spanning tree (MST), characteristic path length, and average cycle length are accomplished using expensive computations that can be converted to distributed algorithms to achieve scalability. In this way, a chosen system is able to efficiently compute these types of invariants to apply GDM to network traffic by leveraging the power of distributed system nodes. Thus, distributed invariant algorithms may be executed in a distributed fashion on the hosts of the network. The distribution of these calculations enables scalability, in a manner similar to that of telephone companies that use distributed algorithms to efficiently compute MST in order to determine the cost of telephone calls, as well as the use of distributed routing algorithms to determine paths across the Internet.

In GDM according to various embodiments, the subgraph isomorphism problem is further extended to cover multiple graphs. GDM is structured to discover, among other patterns: frequent patterns for reading and responding to email, frequent patterns for surveillance, infrequent patterns for intrusion, and infrequent patterns for data exfiltration.

Given a set of graphs {Gk (Vk, Ek, fk)|k=1, . . . , n}, the problem is to find the subgraph Gs (Vs, Es, fs), a set of subgraphs {Gsk (Vsk, Esk, fk)|k=1, . . . , n} and a bijection mapping function fs between the vertices of Gs and every Gsk for all k=1, . . . , n. When a function fs satisfying this condition exists, Gs(Vs, Es) is a common subgraph of the given set of graphs. This definition of subgraph isomorphism provides the basis for matching and counting of topologically identical parts of the given graphs in a system.

GDM is often more useful when coupled with an efficient graph search solution to the subgraph isomorphism problem among multiple graphs. Thus, various embodiments make use of multiple methods for graph searching.

Graph search algorithms can be classified by the completeness of search and whether they use direct or indirect methods for matching. Direct methods solve the subgraph isomorphism problem directly, whereas indirect search uses similarity measures to find similar graphs.

Greedy algorithms can be used to apply heuristic search and direct matching. Greedy algorithms can use Depth First Search (DFS) and/or Breadth First Search (BFS), perhaps constrained by memory and time limitations. The greedy DFS algorithm is constrained by the maximum depth of search, whereas the greedy BFS may be constrained by memory limits or the number of concurrent branches searched. Greedy algorithms can also be distributed among the hosts of a system in some embodiments, and a distributed variant of the greedy algorithm as used by various system embodiments should be less resource constrained, since it is distributed over all of the resources in a network.

Inductive Logic Programming (ILP) may also be used in some embodiments, perhaps combined with abduction to select hypotheses and justify the selected hypotheses through observations. ILP can be used to introduce background knowledge to subgraph isomorphism, as well as to the objective of performing GDM. It can also derive knowledge from a given set of graph data given the background knowledge. Because general graphs can be represented in first order predicate logic, ILP implementations enjoy flexibility in defining variables and rules with respect to communications graphs.

Given the background knowledge B and the evidence (observed data) E, where E comprises positive evidence E+ and the negative evidence E−, ILP can be used to find a hypothesis H such that the following "normal semantics" conditions hold: posterior satisfiability: $B\hat{\ }H\hat{\ }E^-|\neq\square$, and posterior sufficiency: $B\hat{\ }H|=E^+$, where $\square$ is false, so that $|\neq\square$ means that the theory is satisfiable.

In ILP, intentional definitions are derived from the data represented by instantiated first order predicates, i.e., extensional definitions. Benefits are not limited to the knowledge to be discovered, but extend to the ability to use the positive and the negative examples in the induction of the knowledge. Disadvantages may include the size of the search space and computational intractability.

ILP may include any of heuristic or complete searching, as well as direct and indirect matching according to the background knowledge used to control the search process. When control knowledge is used to prune some search paths having a lower probability of finding isomorphic subgraphs under a given mining measure, the method may be chosen as a heuristic search. Otherwise, it may be chosen as a complete search. When knowledge of predetermined subgraph patterns is introduced to match subgraph structures, the method may be chosen as indirect matching since only the subgraph patterns including the predetermined patterns or similar to the predetermined patterns are mined. In this case the subgraph isomorphism is not strictly solved. Many embodiments can utilize a distributed implementation of ILP algorithms.

An inductive approach may use GDM algorithms to pre-generate inductive rules, patterns, and relationships. The induced results may then be stored in an inductive database. Queries over the database can be automatically generated. This approach may be used to improve GDM performance.

Finally, distributed Support Vector Machine (SVM) algorithms may be used to apply ML to perform GDM. This approach is classified as a heuristic graph search using indirect pattern matching. However, the distributed SVM approach uses feature vectors rather than graph data. For example, given feature and class vectors, each sample feature vector in the data can be classified. By extending the feature space to higher dimension spaces, SVM can successfully classify samples by a linear hyper plane even under complex nonlinear distributions of the samples in terms of the class in the set of vectors. Accordingly, SVM can provide an efficient classifier based on the set of graph invariants, and provide a useful adjunct to the other activities described with respect to the various embodiments.

Any of the components previously described can be implemented in a number of ways, including simulation via software. Thus, the system 100; networks 110; hosts 120, 135; links 130, set of components 140; GDM component 150; ML component 160; analysis engine 170; distributed component 180; network objects 190; graph 200; set of subgraphs 210; and subgraphs 220, 230, 240, 250, and 260 may all be characterized as "modules" herein.

Such modules may include hardware circuitry, single and/or multi-processor circuits, memory circuits, software program modules and objects, and/or firmware, and combinations thereof, as desired by the architect of the system 100, and as appropriate for particular implementations of various embodiments. For example, such modules may be included in a system operation simulation package, such as a software electrical signal simulation package, a message propagation simulation package, a network host simulation package, a network attack simulation package, and/or a combination of software and hardware used to operate, or simulate the operation of various potential embodiments.

It should also be understood that the apparatus and systems of various embodiments can be used in applications other than hosts coupled via networks, and thus, various embodiments are not to be so limited. The illustration of a system 100 is intended to provide a general understanding of the structure of various embodiments, and not intended to serve as a complete description of all the elements and features of apparatus and systems that might make use of the structures described herein. Such apparatus and systems may further be included as sub-components within a variety of electronic systems and processes, including local area networks (LANs) and wide area networks (WANs), among others.

Figure 3:
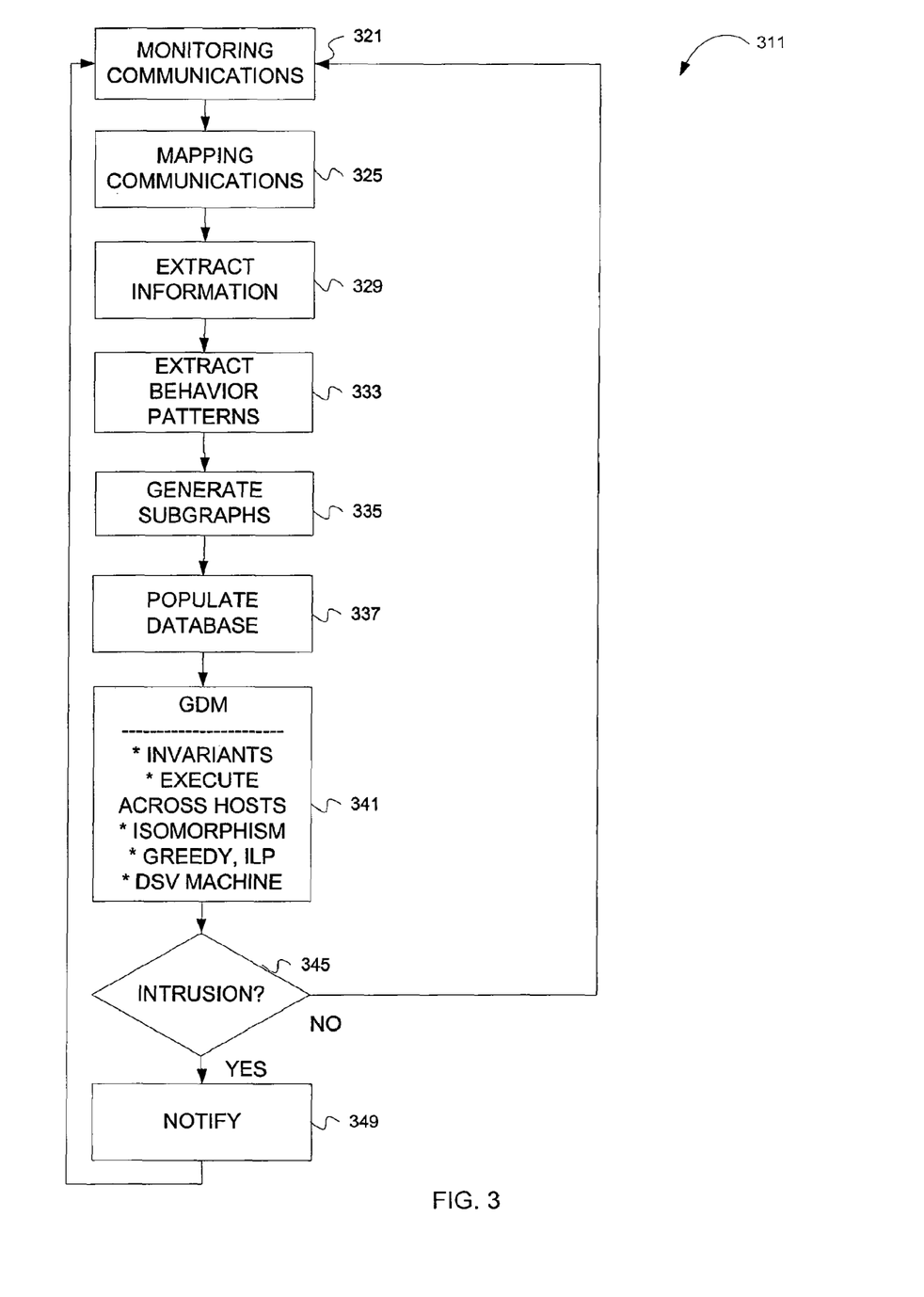
FIG. 3 is a flow diagram illustrating several methods according to various embodiments of the invention.

Some embodiments may include a number of methods. FIG. 3 is a flow diagram illustrating several methods 311 according to various embodiments of the invention. A computer-implemented method 311 to detect intrusion in a network may (optionally) begin at block 321 with monitoring communications between network objects coupled to each other via one or more networks. The method 311 may continue with mapping the communications to one or more communications graphs at block 325, wherein at least one of the one or more communication graphs is physically distributed over a plurality of network hosts. In some embodiments, the method 311 may include extracting information associated with a portion of the communications (or indeed, all of the communications), perhaps using a network protocol analyzer.

The method 311 may continue on to block 333, with extracting behavior patterns, including patterns of infrequent behavior and frequent behavior, from the one or more communication graphs using graph-based metrics. Frequent and infrequent behavior can be described by using the relative frequency of graph substructures tabulated over a frequency distribution. From the frequency distribution one can determine the probability of a substructure appearing in the communication graph, with those substructures that appear with less frequency being characterized as "infrequent" and those appearing with greater frequency being characterized as "frequent". Infrequent behavior can often be equated with detecting intrusion.

The method 311 may include generating one or more subgraphs representing a portion of the communications occurring with respect to one or more of the network hosts at block 335. For example, generating subgraphs might comprise generating one or more of a general subgraph, an induced subgraph, and/or a connected subgraph.

In some embodiments, the method 311 includes populating an inductive database with inductive rules, inductive patterns, and/or inductive relationships associated with the one or more communications graphs at block 337.

The method 311 may include the use of GDM for a selected subgraph and the one or more communications graphs at block 341. The use of GDM may comprise a number of mechanisms, as outlined above. For example, in some embodiments, the use of GDM may comprise using graph invariants comprising SNA metrics, which are a subset of graph invariants. The use of GDM may also comprise executing a plurality of GDM algorithms, wherein each one of the plurality is distributed to each of the network hosts.

In some embodiments, the use of GDM comprises determining the existence of subgraph isomorphism, wherein the selected subgraph is substantially topographically equivalent to another subgraph included in the one or more communications graphs.

The use of GDM may also comprise executing one or more greedy algorithms, and/or one or more ILP algorithms, on each of the network hosts. Executing a greedy algorithm may comprise executing a DFS algorithm and/or a BFS algorithm. Executing an ILP algorithm may comprise executing a search using at least one of a heuristic search and a complete search, and/or pattern-matching using at least one of direct matching and indirect matching.

In some embodiments, the use of GDM comprises using a distributed support vector machine to classify feature vectors based on a set of graph invariants associated with the one or more communications graphs. It should be noted that any one of the GDM mechanisms described with respect to block 341 can be used singly, or in combination, depending on the design of a particular embodiment.

The method 311 may continue on to detecting intrusion at block 345 with respect to the at least one network using GDM for a selected subgraph and the one or more communications graphs. If no intrusion is detected, the method 311 may return to block 321. If intrusion is detected (e.g., subgraph isomorphism is determined to exist with respect to a subgraph representing an infrequent behavior pattern, perhaps comprising a known malicious pattern), the intrusion may be reported, and notification provided by the system at block 349. The method 311 may then continue on to block 321.

It should be noted that the methods described herein do not have to be executed in the order described, or in any particular order. In many embodiments, the methods are executed as a distributed aggregate over a number of hosts running identical instances of software. Thus, various activities described with respect to the methods identified herein can be executed in repetitive, simultaneous, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment, including hypertext markup language (HTML) and extensible markup language (XML).

Figure 4:
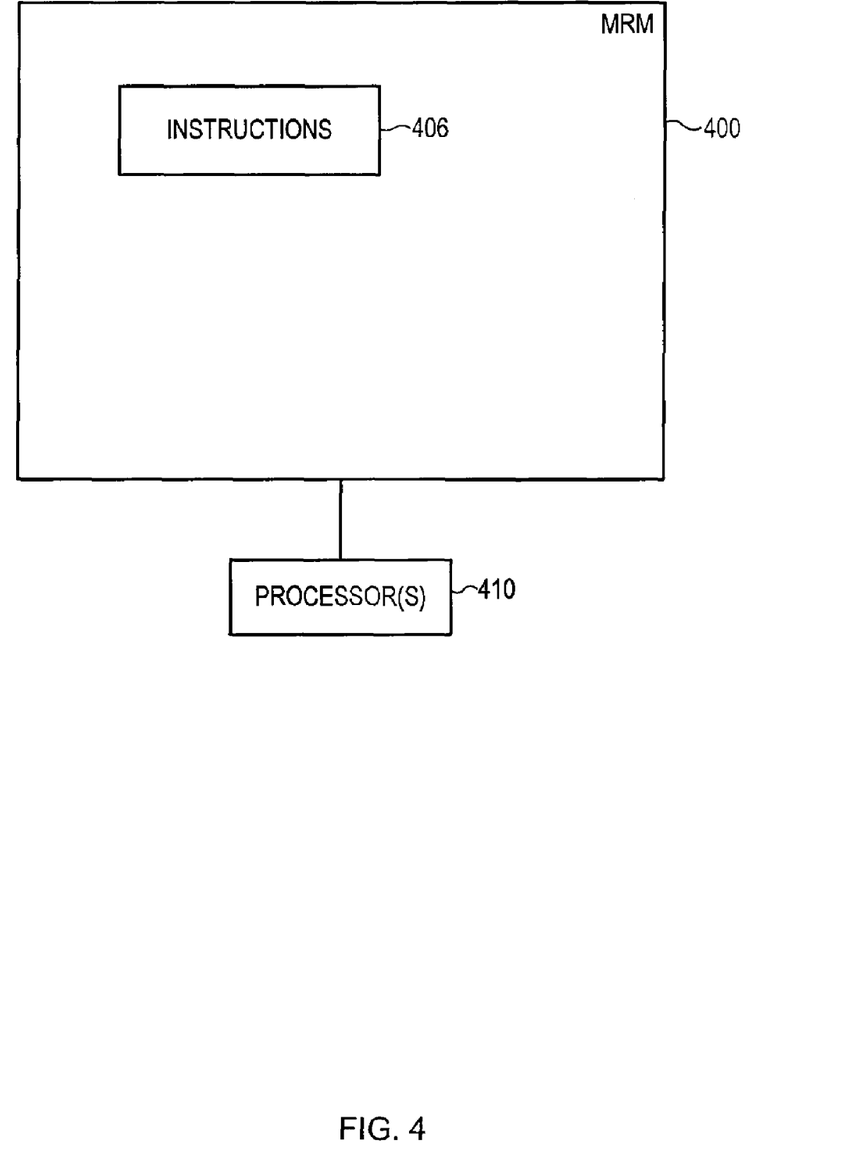
FIG. 4 is a block diagram of an apparatus including a machine-readable medium according to various embodiments of the invention.

Thus, other embodiments may be realized. For example, FIG. 4 is a block diagram of an apparatus including a machine-readable medium (MRM) 400 according to various embodiments of the invention. Examples of such embodiments may comprise a memory system, a magnetic or optical disk, a flash drive, or some other storage device. The MRM 400 may contain instructions 406 which, when accessed, result in one or more processors 410 performing any of the activities previously described, including those discussed with respect to the methods 311 noted above. For example, the MRM 300 may comprise firmware used to simulate the operations described above, or to direct the execution of such operations in association with one or more hosts in a networked data processing and communications environment.

Thus, in some embodiments, a MRM 400 may have instructions 406 stored thereon which, when executed by a computer (e.g., one or more processors(s) 410), cause the computer to perform operations such as monitoring communications between network objects coupled to each other via at least one network, mapping the communications to one or more communications graphs (wherein at least one of the one or more communication graphs is physically distributed over a plurality of network hosts), and detecting intrusion with respect to the at least one network using GDM for a selected subgraph and the one or more communications graphs. Monitoring the communications may comprise using each one of the network hosts to monitor a subset of the communications between the network objects, wherein the size of the subset is limited to communications between neighbor hosts.

The instructions 406, when executed by one or more processors, may also results in the performance of operations that include determining the existence of subgraph isomorphism with respect to the selected subgraph and another subgraph included in the one or more communications graphs. Other operations may also be performed.

Implementing the apparatus, systems, and methods according to various embodiments may permit automating the task of intrusion detection in electronic networks without the use of attack signatures or a centralized administration/intrusion detection component. Most embodiments are scalable to large network sizes, enabling intrusion detection in a wider variety of circumstances, perhaps obviating the use of less efficient hub-and-spoke security architectures.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method, comprising:
   monitoring communications between network nodes coupled to each other via at least one network;
   mapping the communications to one or more communications graphs, wherein at least one of the communication graphs is physically distributed over a plurality of mapping network hosts;
   computing relative frequency of discovered subgraphs representing behavior patterns within the communications graphs; and
   detecting indications of malicious behavior with respect to the at least one network without using signatures by identifying infrequent patterns of the behavior relative to frequent patterns of the behavior according to the relative frequency.

2. The method of claim 1, comprising: using graph-based data mining (GDM) or distributed GDM to discover the relative frequency of subgraphs.

3. The method of claim 2, wherein using the GDM or distributed GDM comprises:
   using graph invariants.

4. The method of claim 3, wherein using graph invariants comprises:
   using the graph invariants comprising social network analysis metrics.

5. The method of claim 2, wherein using the GDM or distributed GDM comprises:
   determining the existence of subgraph isomorphism, wherein a selected one of the subgraphs is substantially topographically equivalent to another subgraph included in the one or more communications graphs.

6. The method of claim 2, wherein using the GDM or distributed GDM comprises:
   executing at least one of a greedy algorithm, or an inductive logic programming algorithm, on each of the network hosts.

7. The method of claim 6, wherein executing the greedy algorithm comprises:
   executing at least one of a depth first search algorithm, or a breadth first search algorithm.

8. The method of claim 6, wherein executing the inductive logic programming algorithm comprises:
   executing at least one of a search using at least one of a heuristic search or a complete search, or pattern-matching using at least one of direct matching or indirect matching.

9. The method of claim 2, wherein using the GDM or distributed GDM comprises:
   using a distributed support vector machine to classify feature vectors based on a set of graph invariants associated with the one or more communications graphs.

10. The method of claim 1, comprising:
    generating one or more of the subgraphs representing a portion of the communications occurring with respect to at least one of the network nodes.

11. The method of claim 10, wherein generating the one or more subgraphs comprises:
    generating at least one of a general subgraph, an induced subgraph, or a connected subgraph.

12. The method of claim 1, comprising:
    extracting information associated with the communications using a network protocol analyzer.

13. The method of claim 1, comprising:
    populating an inductive database with at least one of inductive rules, inductive patterns, or inductive relationships associated with the one or more communications graphs.

14. A non-transitory machine-readable medium comprising instructions, which when executed by one or more processors, perform the following operations:
    monitoring communications between network nodes coupled to each other via at least one network;
    mapping the communications to one or more communications graphs, wherein at least one of the communications graphs is physically distributed over a plurality of mapping network hosts;
    computing relative frequency of discovered subgraphs representing behavior patterns within the communications graphs; and
    detecting indications of malicious behavior with respect to the at least one network without using signatures by identify infrequent patterns of the behavior relative to frequent patterns of the behavior according to the relative frequency.

15. The non-transitory machine-readable medium of claim 14, comprising instructions, which when executed by the one or more processors, perform the following operations:
    determining the existence of subgraph isomorphism with respect to a selected one of the subgraphs and another subgraph included in the one or more communications graphs.

16. The non-transitory machine-readable medium of claim 14, wherein monitoring the communications comprises:
    using each one of the network hosts to monitor a subset of the communications between the network hosts, wherein the subset is limited to direct communications between each of the network hosts and its neighbor hosts.

17. A system, comprising:
    at least one network; and
    network nodes coupled to each other via the at least one network, wherein each one of a plurality of mapping network hosts includes modules to monitor communications between some of the network nodes, map the communications to one or more communications graphs, wherein at least one of the communication graphs is physically distributed over the plurality of network hosts, compute relative frequency of discovered subgraphs representing behavior patterns within the communications graphs, and detect indications of malicious behavior with respect to the at least one network without using signatures by identifying infrequent patterns of the behavior relative to frequent patterns of the behavior according to the relative frequency.

18. The system of claim 17, comprising:
a network node to represent each one of a network object executing on the plurality of network hosts of the at least one network.

19. The system of claim 17, wherein each one of the network hosts comprises:
a graph-based data mining (GDM) or distributed GDM component;
a machine learning component;
an analysis engine to analyze data provided by the GDM or distributed GDM component and the machine learning component to create a behavior classifier to detect the indications of malicious behavior; and
a distributed component to share the behavior classifier and associated information with neighboring network hosts included in the plurality of network hosts.

20. The system of claim 17, wherein the machine learning component is to train the system to discover behavior classifier and associated information to detect internal attacks and external attacks.

* * * * *